(12) United States Patent
Baird et al.

(10) Patent No.: US 7,210,338 B2
(45) Date of Patent: May 1, 2007

(54) VALVE TESTING DEVICE HAVING INTEGRATED PURGE CIRCUIT AND METHOD OF VALVE TESTING

(75) Inventors: Michael Baird, Kenton, OH (US); Jared Bridenstine, Kenton, OH (US); Michael Cromes, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/192,903

(22) Filed: Jul. 29, 2005

(65) Prior Publication Data

US 2007/0028676 A1  Feb. 8, 2007

(51) Int. Cl.
*G01M 19/00* (2006.01)
*G01M 3/26* (2006.01)

(52) U.S. Cl. ............... 73/49.7; 73/118.1; 73/865.6; 73/865.9

(58) Field of Classification Search ............ 73/49.7, 73/49.8, 118.1, 119 A, 865.6, 865.8, 865.9
See application file for complete search history.

(56) References Cited

U.S. PATENT DOCUMENTS

| | | |
|---|---|---|
| 3,273,384 A | 9/1966 | Flaugher |
| 3,858,436 A | 1/1975 | Hines, Jr. et al. |
| 3,967,495 A | 7/1976 | Wesner et al. |
| 4,041,778 A | 8/1977 | Ikinobu |
| 4,099,703 A * | 7/1978 | Lush ............... 251/122 |
| 4,244,209 A | 1/1981 | Ceramicoli |
| 4,356,724 A | 11/1982 | Ayoub et al. |
| 4,682,495 A | 7/1987 | McNeely |
| 4,809,544 A | 3/1989 | Magoolaghan |
| 4,998,437 A | 3/1991 | Magoolaghan |
| 5,048,329 A * | 9/1991 | Marchini ............ 73/168 |
| 5,184,506 A | 2/1993 | Asada |
| 5,445,016 A | 8/1995 | Neigebauer |
| 5,537,865 A | 7/1996 | Shultz |
| 5,693,878 A | 12/1997 | Giles |
| 5,835,876 A | 11/1998 | Hathaway et al. |
| 6,038,918 A | 3/2000 | Newton |
| 6,343,504 B1 | 2/2002 | Shultz |
| 6,412,341 B1 | 7/2002 | Ballew |
| 6,651,493 B2 | 11/2003 | Myers et al. |

* cited by examiner

*Primary Examiner*—Hezron Williams
*Assistant Examiner*—David A. Rogers
(74) *Attorney, Agent, or Firm*—Standley Law Group LLP

(57) ABSTRACT

A valve testing device and method for determining whether a fluid control valve, such as an automatic transmission valve, is operating acceptably. The device and method of the present invention passes pressurized fluid through the valve and to a flow measuring means where the flow rate of fluid through the valve can be measured. Because contamination within such a valve can contribute to unacceptable flow rate measurements, the device and method of the present invention can also pass purge fluid through the valve in a direction that is opposite to the normal flow of working fluid through the valve.

21 Claims, 4 Drawing Sheets

(EXISTING VALVE)

(EXISTING VALVE)

VALVE TESTING DEVICE HAVING INTEGRATED PURGE CIRCUIT AND METHOD OF VALVE TESTING

BACKGROUND OF THE INVENTION

The present invention is directed to a device and method for testing the condition of fluid control devices, particularly fluid control valves found in automatic transmissions of vehicles. More particularly, the present invention is directed to a device and method for determining whether such a fluid control device exhibits an acceptable flow rate.

Modern automatic transmissions commonly employ a plurality of fluid control valves in their design and construction. Such valves may take the form of, for example, shift solenoids, pressure regulating solenoids, and pressure switches.

These valves may be of various design, but typically operate to regulate or restrict the passage of fluid through a portion of the automatic transmission. For example, a valve may include a housing containing a solenoid or similar actuating device that is coupled to a movable valve spool. The valve spool moves within a chamber in the housing and acts to regulate the flow of fluid through the valve. As such, these valves can be used to also regulate the flow of fluid through an automatic transmission, thereby providing for the desired shifting operation thereof.

Such a valve may experience operational problems, or may become inoperable, for a number of reasons. For example, it is possible for contaminants to be or become present in the automatic transmission fluid supply and to be circulated through the valve. These contaminants may comprise debris such as pieces of dirt or gasket material, for example. When traveling through a valve, one or more pieces of debris may become lodged on the spool or in the chamber within which the spool moves. If the piece of debris is of significant size, or a sufficient quantity of debris accumulates, movement of the valve spool and operation of the valve can be negatively affected.

Many automatic transmission valves employ a valve spool having a distal end that is adapted to press against a spring-loaded check valve or similar device. Hence, it is also possible that the distal end of the valve spool may become deformed after long term and repeated contact with such a check valve. Such a deformation of the valve spool can also cause a malfunction of the valve and negatively affect its ability to regulate fluid flow through the transmission.

An automatic transmission as a whole may malfunction or fail for a number of reasons, not all of which are related to the fluid control valves located therein. Further, an automatic transmission malfunction or failure may be due to a problem with one or more of its fluid control valves, while a remainder of such valves may be operating normally.

Because of the significant cost involved with replacing an automatic transmission, malfunctioning or failed transmissions are often rebuilt or remanufactured. In such a case, it is desirable to know whether the valves of the automatic transmission are in proper working order. While certain known devices have been constructed to test these valves while they are still in the transmission, much of such testing is actually done after the valves have been removed.

As stated previously, a single automatic transmission may contain a number of such valves. Consequently, when rebuilding an automatic transmission, or testing valves from one transmission for use in another, it is also desirable to have a means by which the valves can be quickly, accurately and reliably checked for proper operation. This is especially relevant in a manufacturing environment, such as an automotive transmission manufacturing environment, where a high volume of valves may be tested on a regular basis.

Currently known devices and methods do not satisfy these requirements. The aforementioned devices designed to test valves while they are still installed to a transmission are not readily usable in this setting. Further, such valves can perform improperly for a number of reasons: some of which can render the valve unusable and some of which may be easily corrected. For example, a valve may exhibit unacceptable flow characteristics due to the presence of minor contamination, or due to a more serious problem—such as a deformation of a valve stem or spool. Currently known devices and methods for testing valves cannot readily distinguish between such problems, thereby resulting in the unnecessary disposal of useable valves.

SUMMARY OF THE INVENTION

The valve testing device of the present invention and its method of use allows valves such as those described above to be easily and reliably tested after removal from a vehicle transmission. The device is designed to receive and retain a valve during testing. The device causes fluid to flow through the valve being tested in the same direction that working fluid would normally pass therethrough when the valve is installed to a transmission. The device includes a flow meter or other measuring equipment suitable to determine the flow rate of the fluid as it travels through the valve. By comparing the measured flow rate to an expected flow rate, it can be determined whether the valve is operating acceptably and, hence, can be reused.

Because it is possible for a valve to exhibit an unacceptable flow rate due to both contamination and more serious defects, the present invention is designed to dislodge contaminants that may reside within the valve. To this end, the device has the ability to also pass fluid through the valve in a direction opposite to the direction that working fluid would normally pass therethrough when the valve is installed to a transmission. This reverse flow of fluid is generally sufficient to dislodge any contaminants of sufficient size to adversely affect the fluid flow through the valve. Use of a reverse fluid flow may be employed only when a valve exhibits an initially unacceptable flow rate. Alternatively, passage of a reverse fluid flow through the valve may be caused to occur before initial testing of the valve in order to help assure that an unacceptable flow rate reading is not due simply to contamination. Therefore, by employing the device and method of the present invention, a user thereof can be reasonably assured that a valve that exhibits an unacceptable flow rate is not just dirty but, rather, is suffering from a defect that renders it unfit for further use.

The device and method of the present invention allows a user thereof to quickly and efficiently test a large number of such valves. The user is able to reliably determine whether a valve is fit for reuse without having to perform a detailed, and often destructive, inspection of each valve that exhibits a less than acceptable flow rate. Consequently, the device and method of the present invention greatly improves a user's ability to process valves and to rebuild transmissions.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
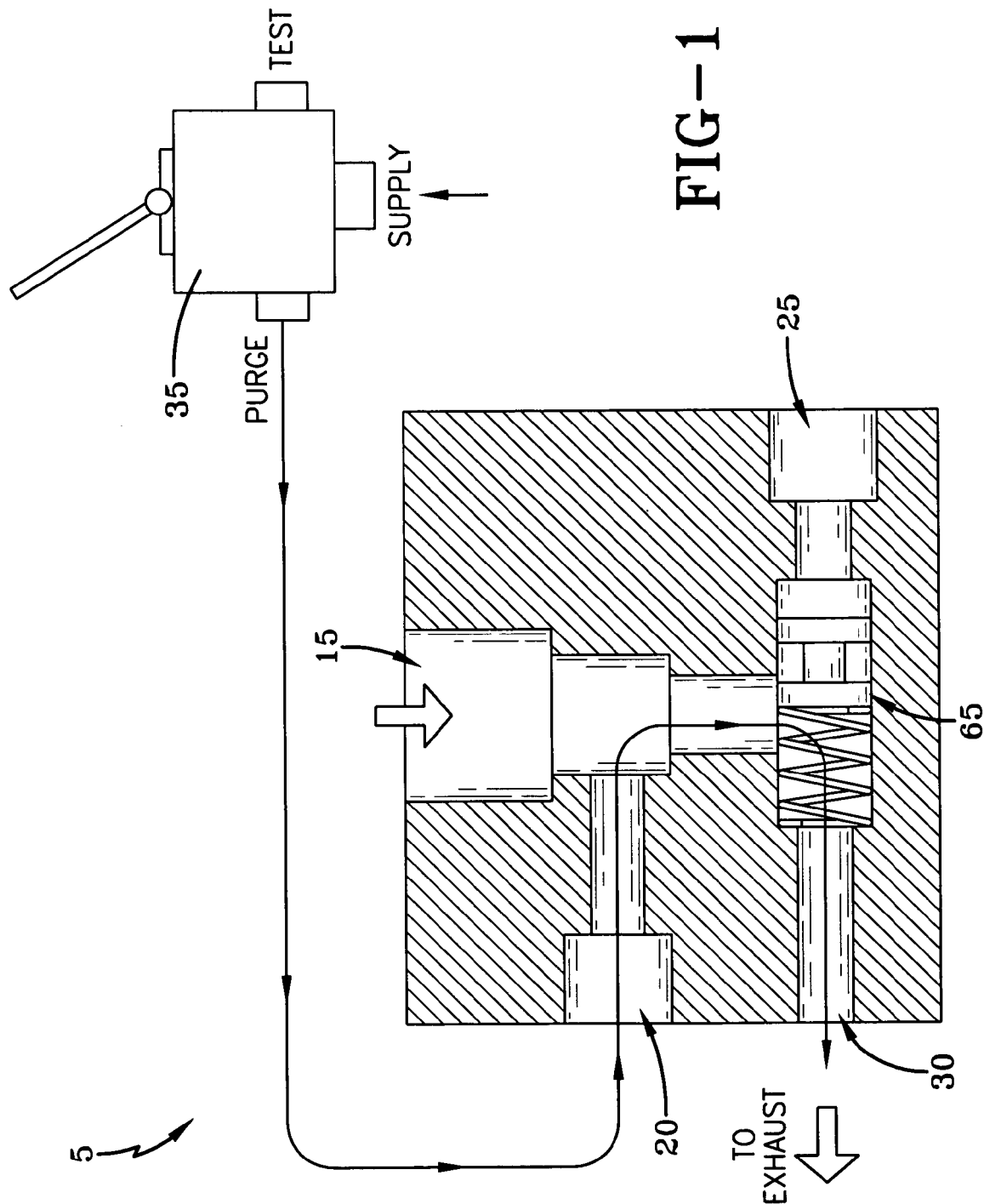
FIG. 1 is a schematic diagram representing the operation of a valve flow tester device of the present invention in a purge mode.
Figure 2:
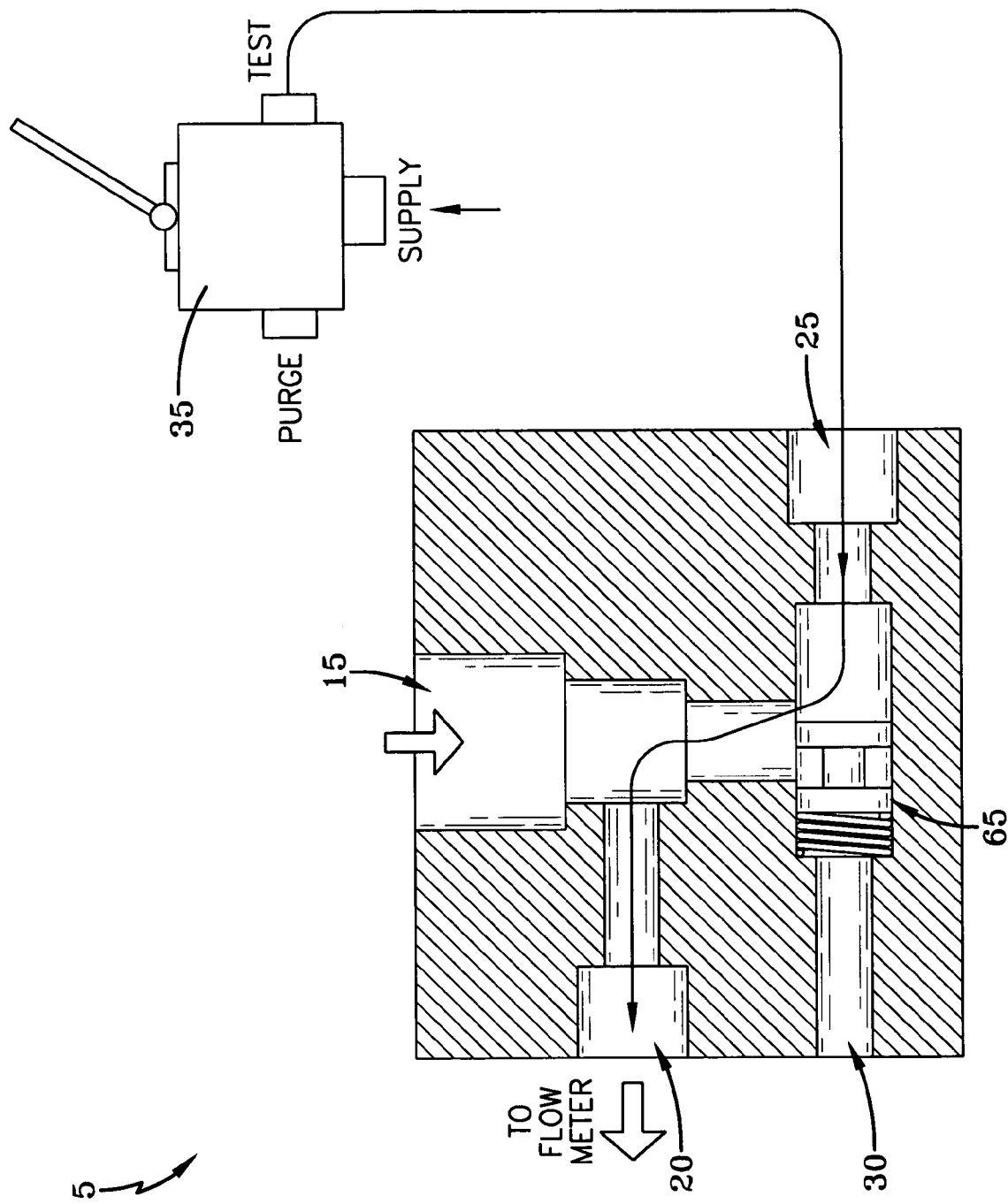
FIG. 2 is a schematic diagram representing the operation of the valve flow tester device of FIG. 1 in a test mode.

An exemplary embodiment of a valve testing device 5 of the present invention is represented by the schematic diagram of FIGS. 1–2. The actual testing device 5 may take on many forms, such as a form similar to the portable unit shown in U.S. Pat. No. 6,038,918, for example. The testing device 5 may also be more simplistic in its design and construction, and may or may not be transportable. For example, in contrast to the device shown in U.S. Pat. No. 6,038,918, a testing device of the present invention may be securely mounted to a workbench or other test stand where valve testing is to take place.

In any event, a valve 10 (see FIG. 3) is preferably received and retained in a valve receptacle 15 of the testing device 5 during testing. The valve receptacle 15 may be a bore of proper size and shape to receive the valve, and may be placed in a block of metal, plastic, or some other material, for example. A purge port 20, a test port 25 and an exhaust port 30 are all shown to be in communication with the valve receptacle 15. A supply of pressurized fluid (not shown) is connected to both the purge port 20 (see FIG. 1) and the test port 25 (see FIG. 2). The pressurized fluid may comprise air, oil, or a number of other fluids that would be familiar to one skilled in the art.

Preferably, a directional valve, such as the toggle valve 35 shown, is connected between the source of pressurized fluid and the purge and test ports 20, 25. As will be understood by one skilled in the art, an electronic solenoid operated directional valve and various other types of directional valves can be used in place of the toggle valve 35. The toggle valve 35 or other directional valve operates to selectively direct pressurized fluid from the pressurized fluid source to either the purge port 20 or test port 25 of the testing device 5. Preferably, the toggle valve 35 or other directional valve is of three-way or blocked center-type design, so that fluid from the pressurized source is blocked from passing to the valve 10 when the directional valve is in a center or neutral position.

Figure 3A:
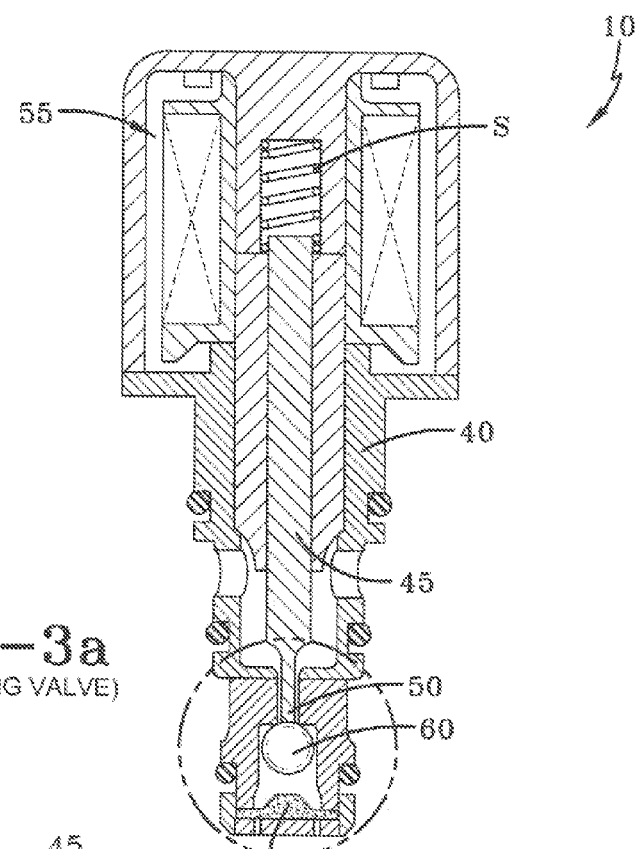
FIG. 3a is a cross-sectional view of an exemplary transmission valve to be tested by the device and method of the present invention, wherein the valve is shown in an energized (closed) state.
Figure 3B:
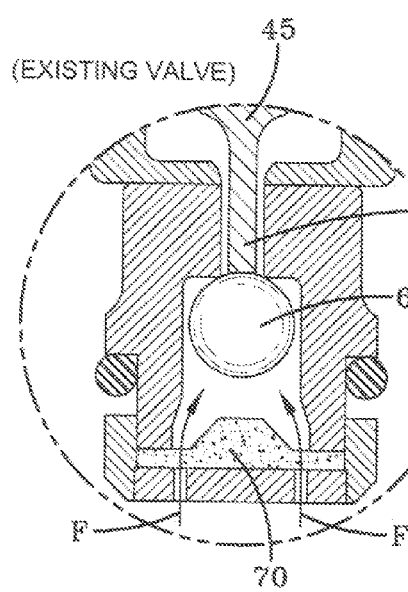
FIG. 3b is an enlarged view of an end portion of the valve of FIG. 3a, wherein the closed (energized) position of the valve can be more clearly observed.

A cross-sectional view of an exemplary embodiment of a transmission valve 10 to be tested using the present invention is presented in FIG. 3a. A closed an open position of the valve 10 can be observed in the enlarged views of FIGS. 3b and 3c, respectively. As can be seen, the valve 10 includes a body 40 that houses a linearly displaceable valve spool 45. Linear displacement of the valve spool 45 either permits or prohibits the flow of working fluid through the valve 10 and to a particular section(s) of the transmission. In the embodiment of FIGS. 3a and 3b, the valve spool 45 is biased toward the (closed) position shown by means of an energized solenoid 55. When the valve spool 45 is held in this position by the solenoid 55, fluid F entering the valve 10 causes a check ball 60 to seat against the valve body and block passage of the fluid F through the valve 10.

When testing such a valve 10, a source of electrical energy may be provided in order to energize the solenoid 55. The need for this feature will likely depend on whether the particular valve being tested is a normally open or normally closed valve.

Figure 3C:
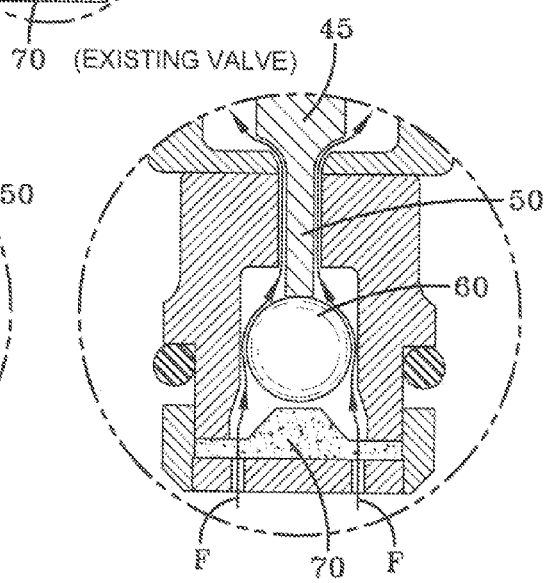
FIG. 3c is an another enlarged view of an end portion of the valve of FIG. 3a, wherein an open (non-energized) position of the valve can be more clearly observed.

As illustrated in FIG. 3c, once the solenoid 55 is de-energized, the valve spool 45 is forced downward by a spring S. In this position, a plunger tip 50 portion of the valve spool 45 displaces the check ball 60, such that fluid F is able to flow through the valve 10. It should be noted that deformation of the plunger tip 50 by its repeated contact with the check ball 60 can lead to a defect that renders the valve unuseable.

As shown in FIG. 1, when the toggle valve 35 is placed in a first, or purge, position, pressurized fluid from the source will flow into the valve receptacle 15 through the purge port 20 of the testing device 5, and into the valve 10. The direction of this fluid flow is opposite to the normal direction of working fluid flow through the valve 10. The purging fluid flow travels through the valve 10 and exits the testing device 5 through the exhaust port 30. The purging fluid flow is blocked from entering the test port 25 by a spring-biased shuttle valve 65 that resides between the test port and the exhaust port 30. As shown, the normally biased position of the shuttle valve 65 allows the purging fluid to flow to the exhaust port 30, but blocks it passage to the test port 20.

The purging fluid is used to dislodge any contaminants, such as dirt or other debris, that may have built up inside the valve 10 during its time in a transmission. Such contaminants may collect at various places within the valve that can cause a reduction in flow rate. However, as most such valves have filter screens 70, it is this location that will most often contain a collection of contaminants.

Because the flow of working fluid through the valve 10 occurs in only a single direction when the valve is installed to a transmission, it can be readily understood that contaminants will build up on only one side of such a filter screen 70. Further, contaminants may also become stuck or compressed on only one side of angled surfaces and other such features. Consequently, passing purging fluid through the valve in the same direction as the normal flow of working fluid will likely do little to dislodge and remove such contaminants. In fact, attempting to purge the valve in this manner may further embed debris into a filter screen or compress debris onto portion of the valve interior. As such, it can be understood that by passing purging fluid through the valve in a direction opposite to that of the normal flow of working fluid, the device and method of the present invention greatly increases the chances that any flow-inhibiting contaminants will be dislodged and removed from the valve.

As shown in FIG. 2, when the toggle valve 35 is placed in a second, or test, position, pressurized fluid from the source will flow into the valve receptacle 15 through the test port 25 of the testing device 5, and into the valve 10. The direction of this fluid flow is in the normal direction of working fluid flow through the valve 10. The test fluid flow travels through the valve 10 and exits the testing device 5 through the purge port 20. The test fluid flow is blocked from entering the exhaust port 30 by the spring-biased shuttle valve. As shown, the test fluid flow is sufficient to shift the shuttle valve 65 from its normally biased position to a position that allows the test fluid to flow to pass into the valve receptacle 15, but blocks it passage to the exhaust port 30. A second similar shuttle valve (not shown) may be used to ensure that the test fluid flow is directed to the flow meter and not back toward the purge side of the toggle valve 35.

Once the test fluid flow exits the purge port 20, it is directed to a flow meter (not shown) where the flow rate can be measured. The measured flow rate can be compared to an expected (acceptable) flow rate, or range of flow rates, to determine if the valve can be used or reused. The flow meter can be any one of many devices capable of measuring fluid flow rate, and such devices would be known to one skilled in the art.

The measured flow rate may be indicated to the user in a number of ways. For example, an actual flow rate may be displayed for viewing by the user. Alternatively, a simple pass/fail indication may be given, such as by means of dissimilar colored indicator lights. In the latter case, the testing device may have a means by which an acceptable flow rate, or range of flow rates, can be set prior to testing.

Figure 4:
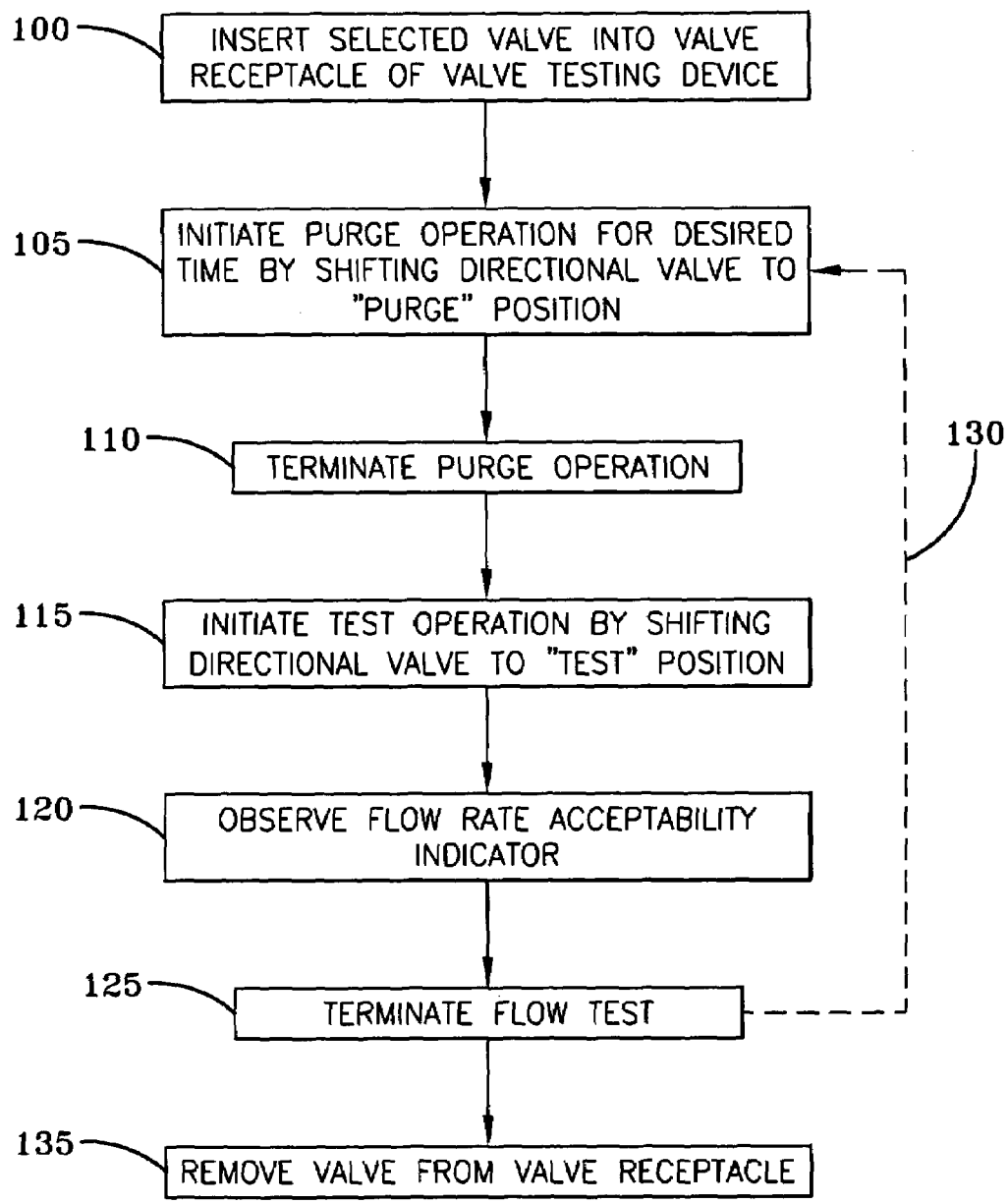
FIG. 4 is a block diagram illustrating the various steps associated with the use of a valve flow tester device of the present invention.

One exemplary method of using a valve testing device of the present invention to test a transmission valve is depicted in the block diagram of FIG. 4. The method of FIG. 4 indicates that a single purge operation is performed prior to a single flow test. It should be realized by one skilled in the art, however, that it is also possible to perform a flow test first, with a subsequent purge operation occurring only if an unacceptable flow rate is detected. It is also possible to perform more than one flow test and/or purge operation. For example, an initial purge operation may be followed by one or more flow tests and one or more additional purge operations. Consequently, each of the flow test and purge operation may be repeated a number of times if desired in order to determine whether a valve is truly defective.

With respect to the testing method illustrated by FIG. 4, it is assumed that a source of pressurized fluid is already connected to the toggle valve 35 or other directional valve, and that such directional valve is connected to each of the purge and test ports 20, 25 of the valve testing device 5 of the present invention. The testing method generally begins with selecting a valve for testing and inserting the valve into the valve receptacle 100. Once the valve is properly seated in the valve receptacle, the purge operation is initiated and allowed to continue for a desired amount of time by placing the directional valve in its purge position 105. Once the desired amount of time has elapsed, the purge operation is terminated 110.

Upon completion of the purge operation, a flow test is initiated by placing the directional valve in its test position 115. During the flow test, the acceptability of the valve is indicated to the user, such as by one of the means described above 120. For example, the user may be shown the actual flow rate through the valve, or a simple indicator light may be used to signal whether or not the valve is acceptable. The selected means of indication is placed in communication with the flow meter for this purpose. Once the condition of the valve has been determined, the flow test is terminated 125.

If a flow test produces unacceptable results, one or more additional purge operations and flow tests may be employed 130. Upon completion of testing, the valve is removed from the valve receptacle 135. The valve may be subsequently marked as useable or as scrap, or may be immediately installed into another transmission. The testing device 5 may thereafter be used to test another valve.

While certain embodiments of the present invention are described in detail above, it should be understood by one skilled in the art that modifications to both the flow testing device and its method of use can be accomplished while still falling within the scope of the present invention. For example, the device may include multiple valve receptacles so that a plurality of valves could be tested simultaneously. It is also possible to automate the process, such as by employing an electronic directional valve(s) and/or by also making use of a PLC or similar apparatus so that the entire purging/testing process may occur automatically. Further, it is also contemplated that the tested valves may be automatically marked by the testing device as acceptable/useable or unacceptable/unuseable. It should also be understood that while the device and method of the present invention are described herein for purposes of illustration as being used with a transmission valve, it is also possible to use the device and method of the present invention with other types of valves. Thus, the scope of the present invention is not to be considered limited by such disclosure, and modifications are possible without departing from the spirit of the invention as evidenced by the following claims.

What is claimed is:

1. A valve testing device having an integrated purge circuit, comprising:
   at least one valve receptacle for receiving a valve to be tested;
   a purge port connected to said at least one valve receptacle;
   a test port and an exhaust port connected to said at least one valve receptacle, said test port and said exhaust port prevented from communication;
   a source of pressurized fluid connected to both said purge port and said test port by a fluid directing means; and
   a flow rate measuring means for measuring the flow rate of fluid through said valve;
   wherein placement of said fluid directing means in a first position causes a purging of said valve by directing pressurized fluid through said valve in a direction opposite to its normal direction of flow through said valve when said valve is in use; and
   wherein placement of said fluid directing means in a second position causes pressurized fluid to travel through said test port and through said valve in a normal direction to said flow rate measuring means.

2. The valve testing device of claim 1, wherein said test port and said exhaust port are prevented from communication by a spring-biased shuttle valve.

3. The valve testing device of claim 1, wherein fluid entering said purge port exits through said exhaust port.

4. The valve testing device of claim 1, wherein said fluid directing means is a directional valve.

5. The valve testing device of claim 4, wherein said directional valve is a manually operated toggle valve.

6. The valve testing device of claim 4, wherein said directional valve is operated by an electric solenoid.

7. The valve testing device of claim 1, wherein said flow rate measuring means is connected to said purge port.

8. The valve testing device of claim 7, further comprising a shuttle valve located between said purge port and said flow rate measuring means such that fluid entering said test port is properly directed to said flow rate measuring means.

9. The valve testing device of claim 1, further comprising an indicator for indicating to a user of said tester whether a valve being tested has exhibited an acceptable flow rate.

10. The valve testing device of claim 9, wherein said indicator displays the actual flow rate of fluid through said valve.

11. A valve testing device having an integrated purge circuit, comprising:
a valve receptacle for receiving a valve to be tested;
a purge port connected to said valve receptacle;
a test port and an exhaust port connected to said valve receptacle, said test port and said exhaust port separated by a first displaceable spring-biased shuttle valve that prevents communication therebetween;
a source of pressurized fluid connected to said purge port and said test port by a directional valve;
a flow meter for measuring the flow rate of fluid through said valve, said flow meter in communication with said purge port; and
an indicating means in communication with said flow meter for indicating whether said flow rate is acceptable;
wherein shifting of said directional valve into a first position causes pressurized purge fluid to travel through said valve in a direction opposite to a normal direction of flow of working fluid through said valve when said valve is in use; and
wherein shifting of said directional valve into a second position causes pressurized test fluid to travel through said valve in a normal direction of flow of working fluid through said valve when said valve is in use, said test fluid also traveling through said flow meter whereby a flow rate of fluid through said valve is measured.

12. The valve flow testing device of claim 11, wherein said directional valve is a manually operated toggle valve.

13. The valve flow testing device of claim 11, wherein said directional valve is operated by an electric solenoid.

14. The valve flow testing device of claim 11, wherein fluid entering said purge port exits through said exhaust port.

15. The valve flow testing device of claim 11, wherein said indicating means displays the actual flow rate of fluid through said valve.

16. A method for determining the condition of a valve, comprising:
placing said valve in a valve receptacle that is connected to a purge port, a test port, and an exhaust port;
connecting a flow meter to said valve receptacle for measuring the flow rate of fluid through said valve;
connecting an indicating means to said flow meter for indicating whether the flow rate of fluid through said valve is acceptable;
using a directional valve to cause pressurized purge fluid from a source of pressurized fluid to travel through said valve in a direction opposite to a normal direction of flow of working fluid through said valve when said valve is in use;
using said directional valve to cause pressurized test fluid from said source of pressurized fluid to travel through said valve in a normal direction of flow of working fluid through said valve when said valve is in use, said test fluid also traveling through said flow meter;
measuring the flow rate of said test fluid through said valve using said flow meter; and
sending a signal to said indicating means so that a user can determine whether said valve is in acceptable operating condition.

17. The method of claim 16, wherein said valve receptacle and direction of pressurized fluid flow are designed for use with an automatic transmission valve.

18. The method of claim 16, wherein purge fluid and/or test fluid is caused to pass through said valve more than one time.

19. The method of claim 16, wherein said indicating means displays the actual flow rate of fluid through said valve.

20. A valve testing device having an integrated purge circuit, comprising:
at least one valve receptacle for receiving a valve to be tested;
a purge port connected to said at least one valve receptacle;
a test port and an exhaust port connected to said at least one valve receptacle, said test port and said exhaust port prevented from communication by a spring-biased shuttle valve;
a source of pressurized fluid connected to both said purge port and said test port by a fluid directing means; and
a flow rate measuring means for measuring the flow rate of fluid through said valve;
wherein placement of said fluid directing means in a first position causes a purging of said valve in a direction opposite to the normal direction of flow through said valve; and
wherein placement of said fluid directing means in a second position causes pressurized fluid to travel through said test port and through said valve to said flow rate measuring means.

21. A method for determining the condition of a valve, comprising:
placing said valve in a valve receptacle that is connected to a purge port, a test port, and an exhaust port;
connecting a flow meter to said valve receptacle for measuring the flow rate of fluid through said valve;
locating a shuttle valve between said test port and said exhaust port such that fluid entering said test port is properly directed to said flow meter;
connecting an indicating means to said flow meter for indicating whether the flow rate of fluid through said valve is acceptable;
using a directional valve to cause pressurized purge fluid from a source of pressurized fluid to travel through said valve in a direction opposite to a normal direction of flow of working fluid through said valve when said valve is in use;
using said directional valve to cause pressurized test fluid from said source of pressurized fluid to travel through said valve in a normal direction of flow of working fluid through said valve when said valve is in use, said test fluid also traveling through said flow meter;
measuring the flow rate of said test fluid through said valve using said flow meter; and
sending a signal to said indicating means so that a user can determine whether said valve is in acceptable operating condition.

* * * * *